(12) United States Patent
Abdul-Hadi et al.

(10) Patent No.: US 8,336,407 B2
(45) Date of Patent: Dec. 25, 2012

(54) UTILITY METER ADAPTER

(75) Inventors: Louay Ibrahim Abdul-Hadi, Woodstock, GA (US); Nathan Edward Woody, Cumming, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 120 days.

(21) Appl. No.: 13/042,764

(22) Filed: Mar. 8, 2011

(65) Prior Publication Data
US 2012/0227518 A1 Sep. 13, 2012

(51) Int. Cl.
*G01D 7/02* (2006.01)
(52) U.S. Cl. ........................................ 73/866.1
(58) Field of Classification Search ........................ None
See application file for complete search history.

(56) References Cited

U.S. PATENT DOCUMENTS

| D310,973 S | 10/1990 | Edwards et al. |
| 5,690,049 A * | 11/1997 | Marshall et al. ............... 116/284 |
| 6,100,816 A | 8/2000 | Moore |
| 7,113,063 B2 | 9/2006 | Romanik et al. |
| 2002/0059895 A1* | 5/2002 | Adams et al. .................. 116/288 |
| 2005/0046417 A1* | 3/2005 | Hwang et al. ............. 324/207.25 |
| 2009/0038535 A1* | 2/2009 | Morales et al. ................ 116/288 |
| 2009/0212767 A1* | 8/2009 | Di Marco et al. ........... 324/207.2 |
| 2012/0227511 A1 | 9/2012 | Davis et al. |

* cited by examiner

*Primary Examiner* — Robert R Raevis
(74) *Attorney, Agent, or Firm* — Kilpatrick Townsend & Stockton LLP

(57) ABSTRACT

An adapter assembly that works with a standard utility meter to wirelessly transmit data about consumption. The adapter assembly generates information about consumption by cooperating with a pointer of an index of a utility meter. In some embodiments, the adapter assembly includes an upper portion and a clip that interface together. The upper portion and the clip are configured to maintain alignment with the pointer and not create stress on the index.

17 Claims, 25 Drawing Sheets

UTILITY METER ADAPTER

This application is related to U.S. Ser. No. 13/042,913, which is filed concurrently herewith, is titled "Utility Meter Adapter," and names Michael B. Davis and Nathan Edward Woody as inventors, the contents of which are hereby incorporated by reference.

RELATED FIELDS

Utility meter adapters, and more particularly, improved adapters for retrofitting an analog utility meter to support remote data collection.

BACKGROUND

The usage of utility products such as gas and electricity and water are typically measured using meters. In the context of gas, a gas meter is used to measure the volume of gas moving through the meter. At least one diaphragm is located inside the typical gas meter that expands and contracts as gas moves through the meter. The movement of the diaphragm causes a rotation of a series of gears inside the meter, which in turn engages a gear located on the back of the face (also referred to herein as the index) of the meter. The gear on the back of the index of the meter turns a pointer that acts as a counter mechanism and that is visible on the face of the meter. Other types of utility meters also include similar types of gears and indexes. Typically, a utility company employee physically inspects each customer's meter and notes the positioning of the counter with respect to the dials on the face of the meter.

The process of determining meter consumption has become more automated in recent years. Automated meters that automatically capture consumption data and transmit this data wirelessly are used in some contexts. In lieu of replacing all existing meters with new automated meters, adapters are used that retrofit existing meters so they are capable of providing remote data collection capability.

SUMMARY

Disclosed are adapter assemblies that work with analog utility meters, such as but not limited to Sensus brand utility meters, to transmit data about consumption. The adapter assembly cooperates with a pointer of an index of a utility meter to generate magnet pulses as the pointer rotates. In some embodiments, the adapter assembly includes an upper portion and a clip that mate together. The upper portion and the clip are configured to interact with each other to maintain alignment with the pointer and reduce stress on the index.

Accurate and complete understanding of the way in which this invention works is not necessary to practice the invention, and Applicants do not wish to be bound by the forgoing or any other understanding of how their invention or any of the prior art works.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different figures is intended to illustrate like or analogous components.

DETAILED DESCRIPTION

FIGS. 1-25 illustrate different views of various components of an adapter assembly 10 according to one embodiment of the invention. An adapter assembly 10 according to this embodiment comprises an upper portion 12 (FIGS. 1-8) and a clip 14 (FIGS. 9-17) that mate together (see FIGS. 18-25).

Figure 1:
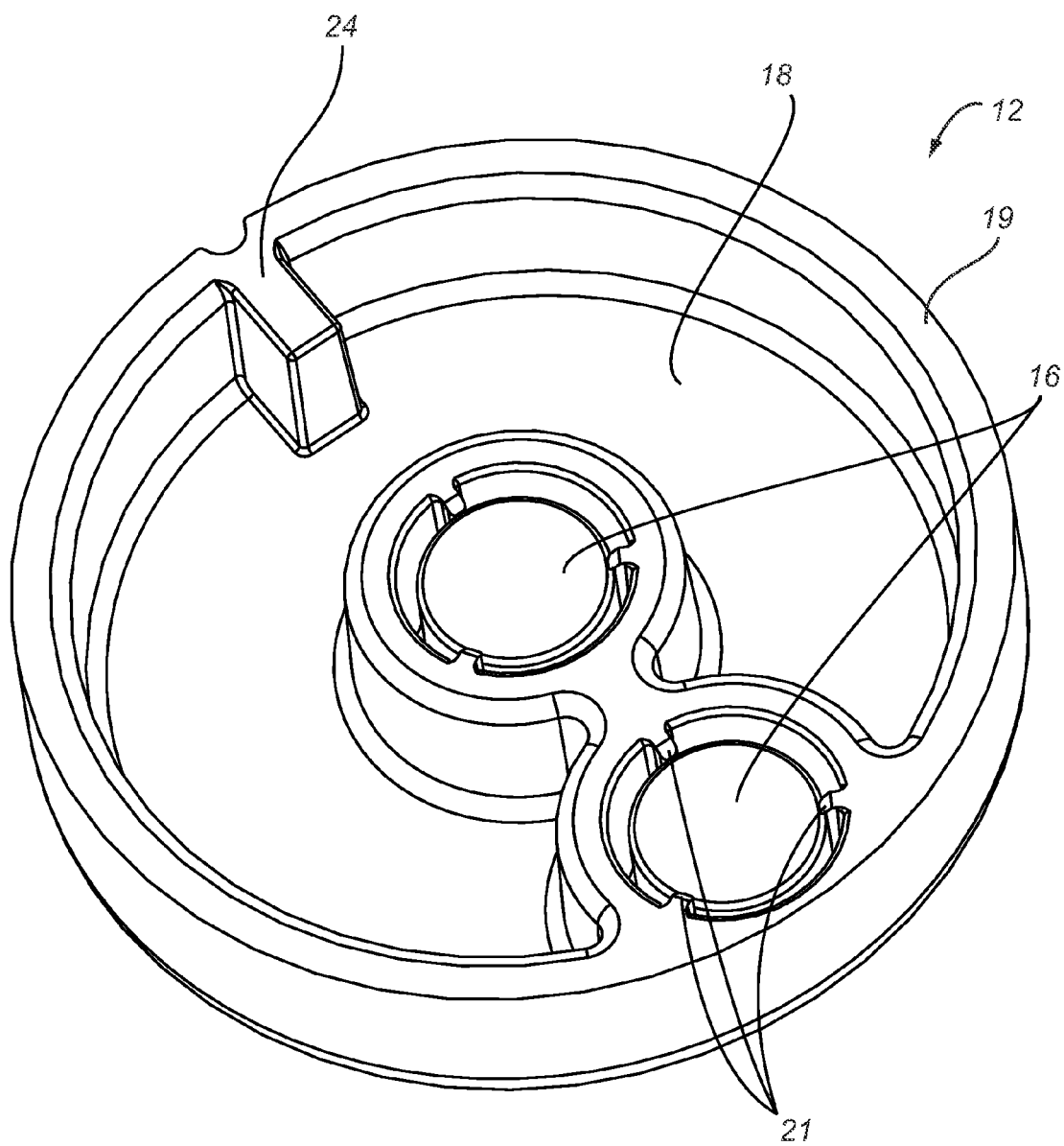
FIG. 1 is a perspective front view of an upper portion of an adapter assembly according to one embodiment of the invention.
Figure 2:
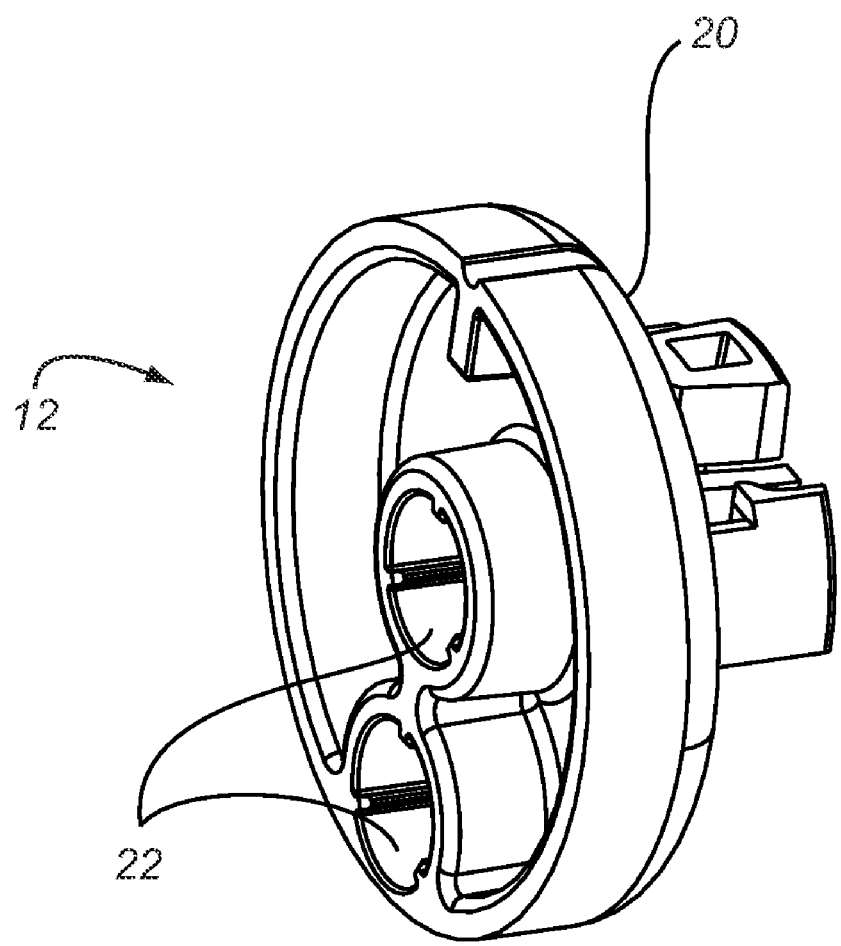
FIG. 2 is a side perspective view of the upper portion of FIG. 1.
Figure 3:
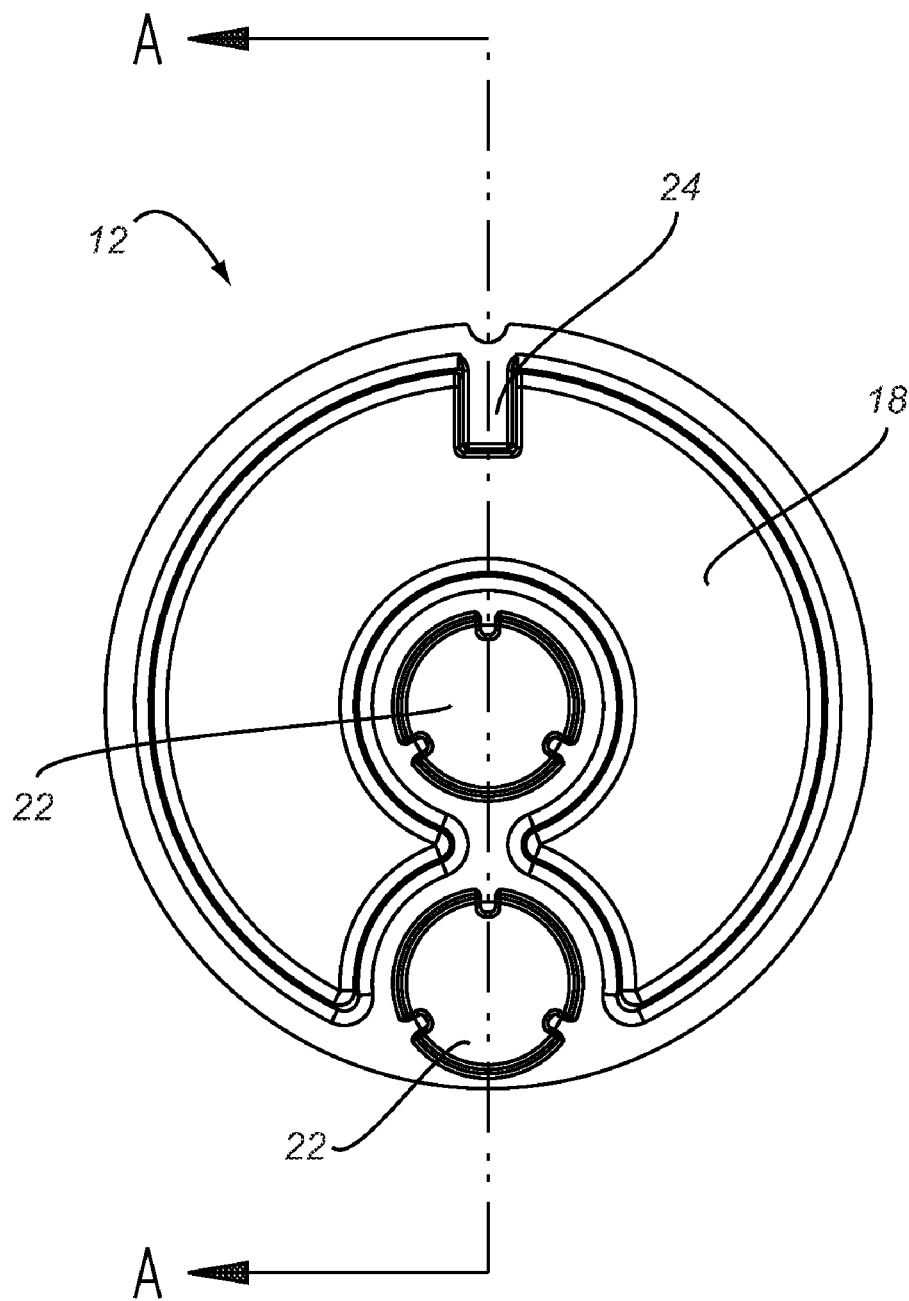
FIG. 3 is a front plan view of the upper portion of FIG. 1.
Figure 4:
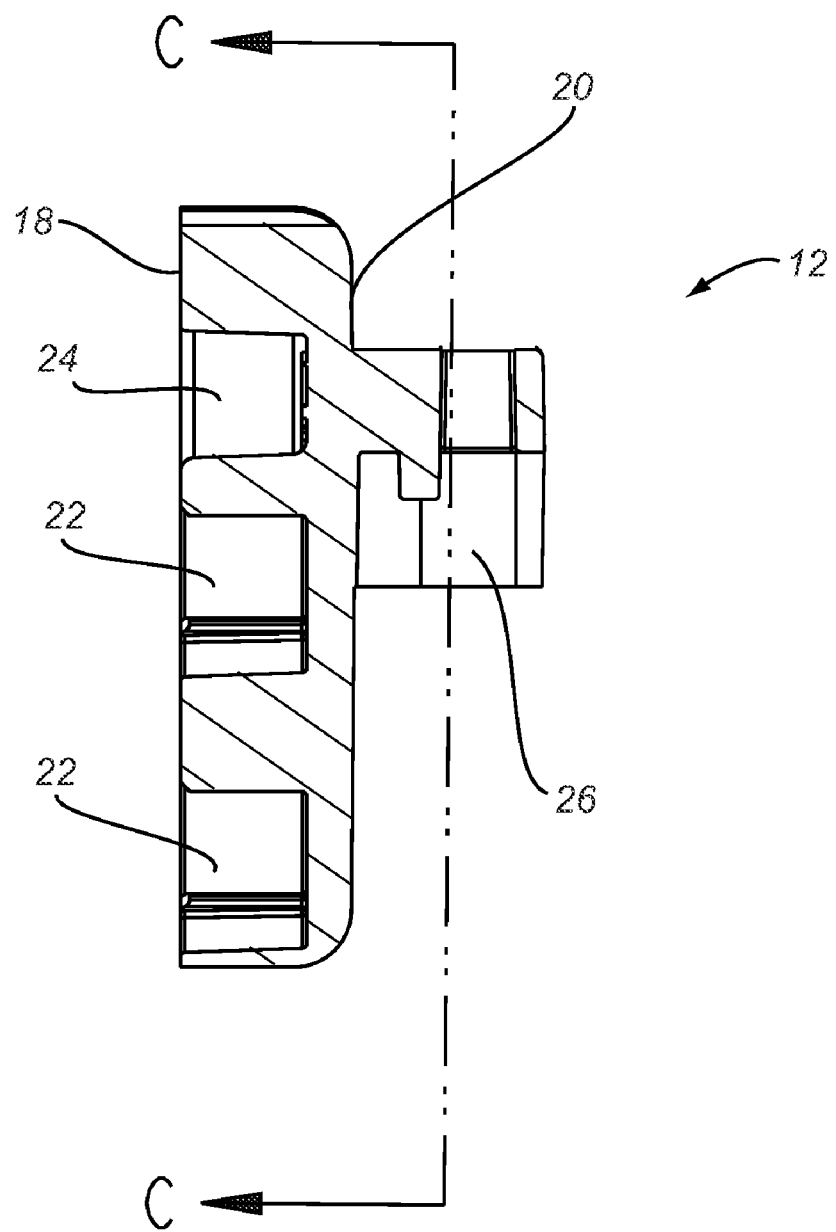
FIG. 4 is a cross-sectional view of the upper portion of FIG. 1, taken along line A-A of FIG. 3.

In some embodiments, upper portion 12 of adapter assembly 10 is circular, although upper portion 12 can be any suitable shape. Upper portion 12 includes a front surface 18 and a back surface 20 (FIG. 4). In some embodiments, a lip 19 extends from front surface 18 around the periphery of the front surface of upper portion 12. One or more cavities 22 are formed on front surface 18 of upper portion 12, the cavities being shaped and sized to receive one or more magnets 16. In the embodiment shown, front surface 18 includes two cavities 22. The cavities 22 include a plurality of ribs 21 that help contain magnet 16 within cavity 22 once magnet 16 is pressed into cavity 22. In some embodiments, front surface 18 also includes an indicator tab 24, which is explained in more detail below. In some embodiments, the cavities are of similar shape and size, although alternative configurations can be used.

Figure 5:
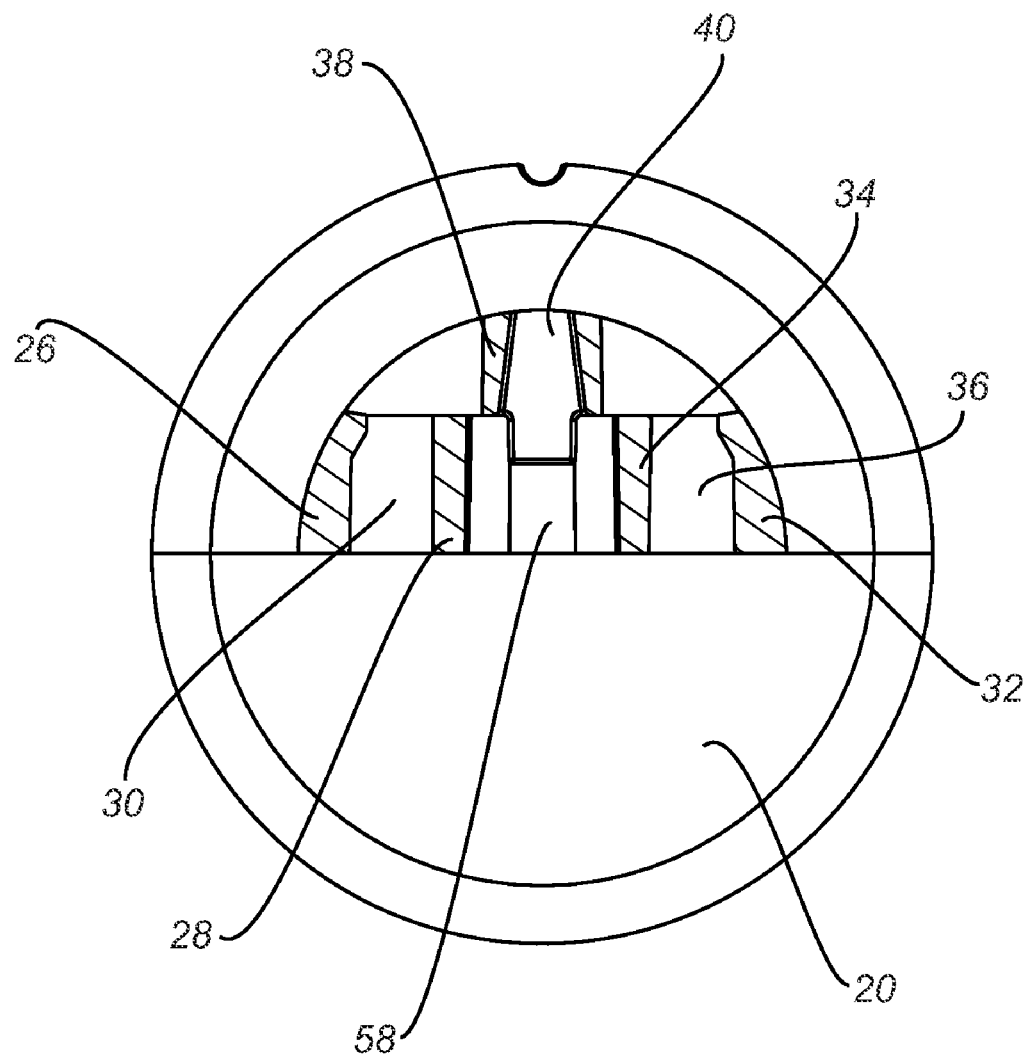
FIG. 5 is a cross-sectional view of the upper portion of FIG. 1, taken along line C-C of FIG. 4.
Figure 6:
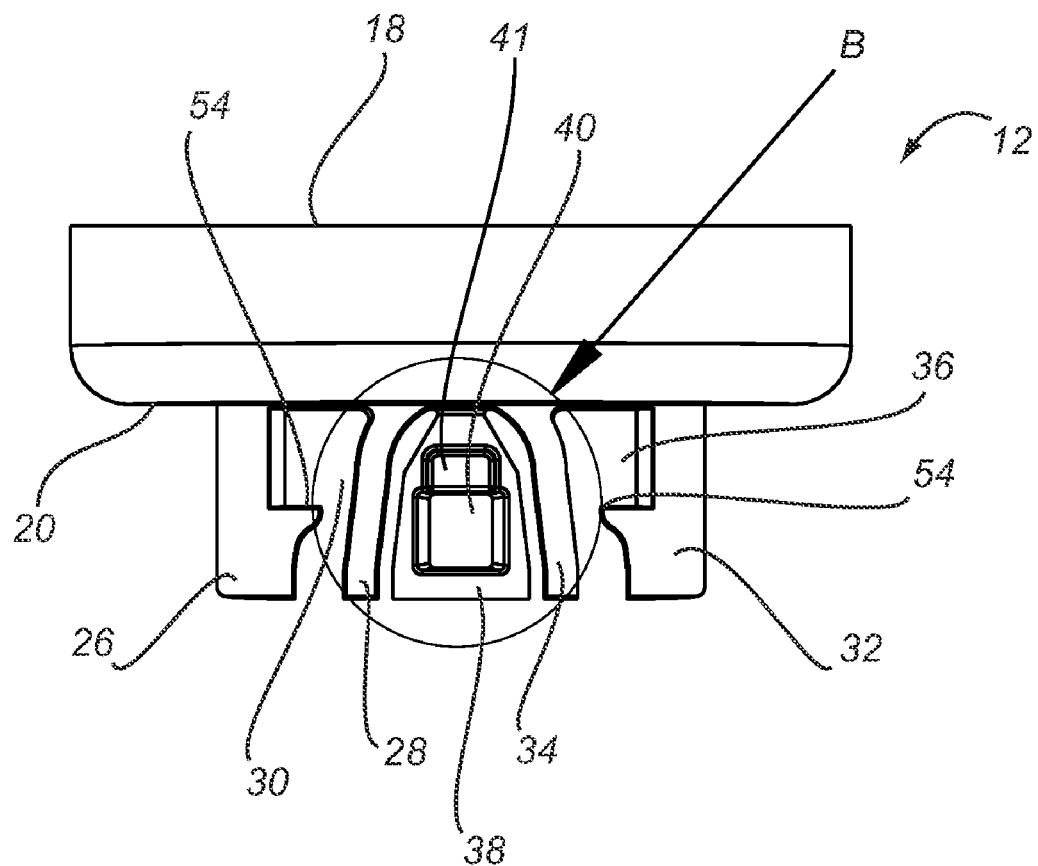
FIG. 6 is a bottom plan view of the upper portion of FIG. 1.
Figure 7:
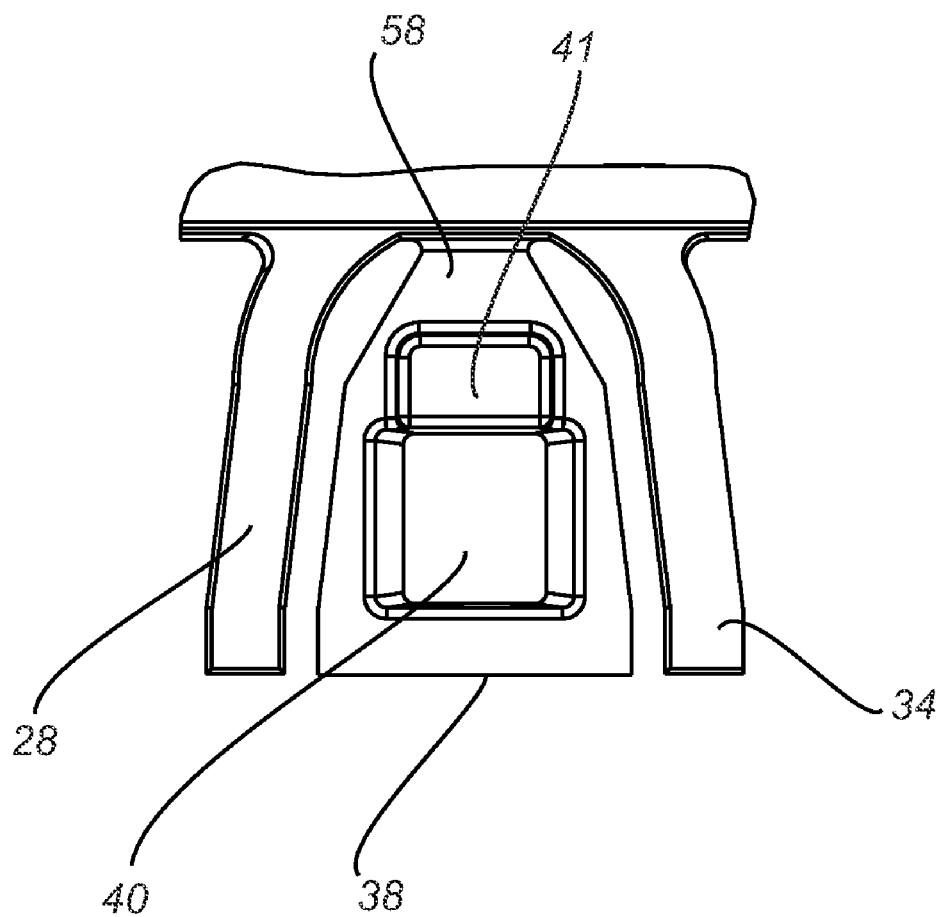
FIG. 7 is an enlarged view taken at inset circle B in FIG. 6.
Figure 8:
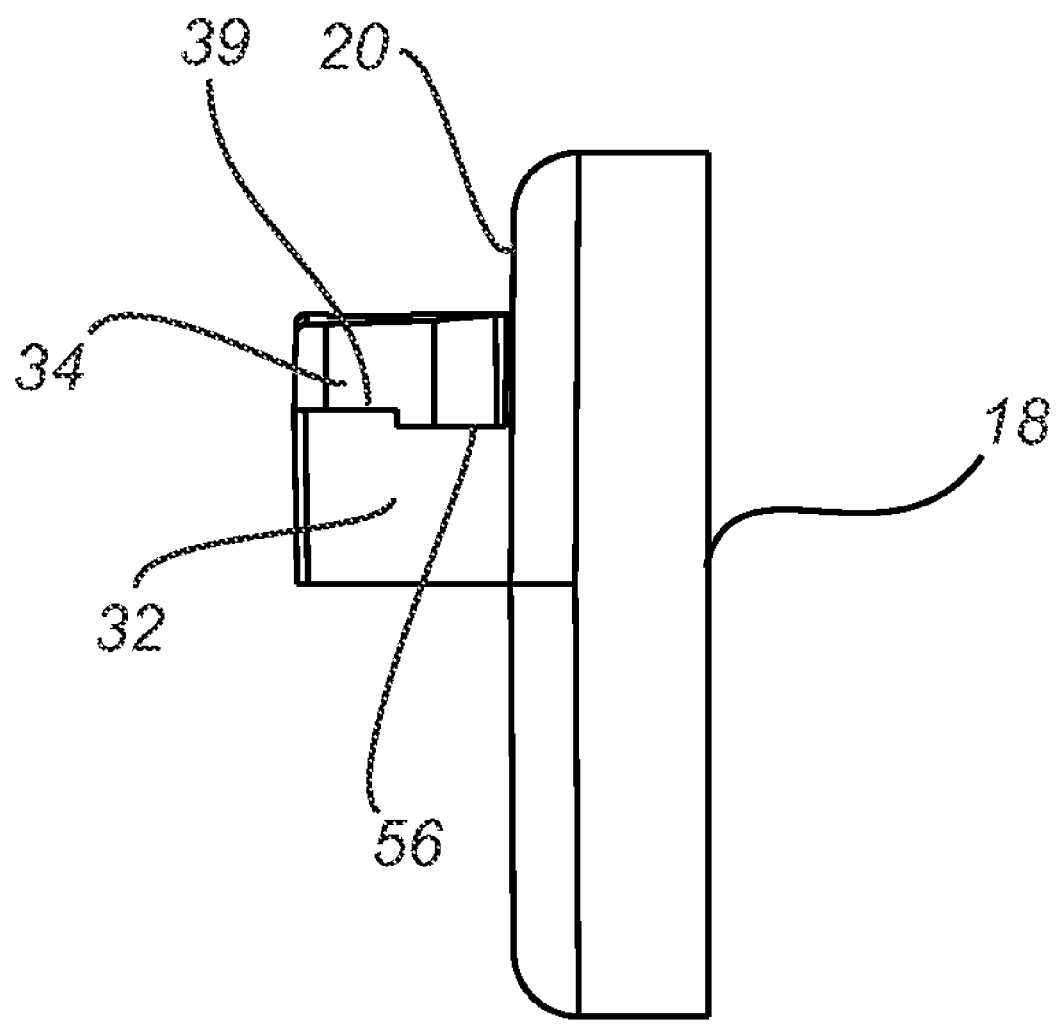
FIG. 8 is a side plan view of the upper portion of FIG. 1.
Figure 23:
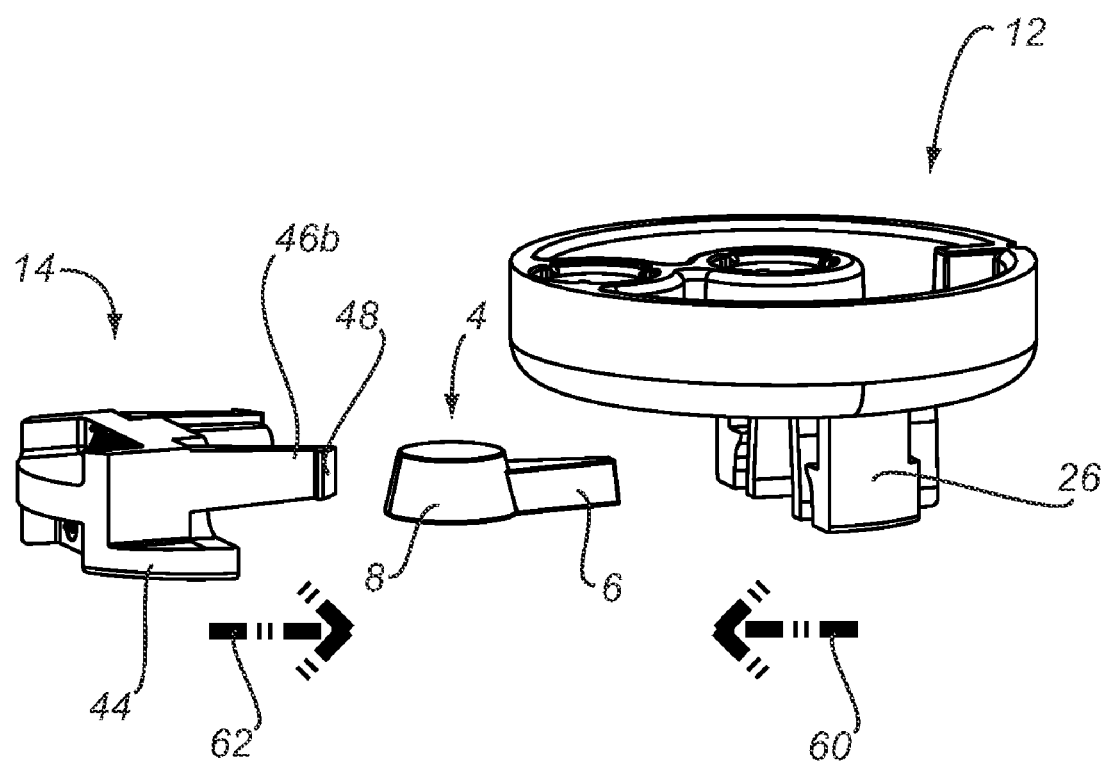
FIG. 23 is an exploded perspective view of the upper portion of FIG. 1 and the clip of FIG. 9 positioned with respect to a pointer of an index, such as the index illustrated in FIG. 18.
Figure 24:
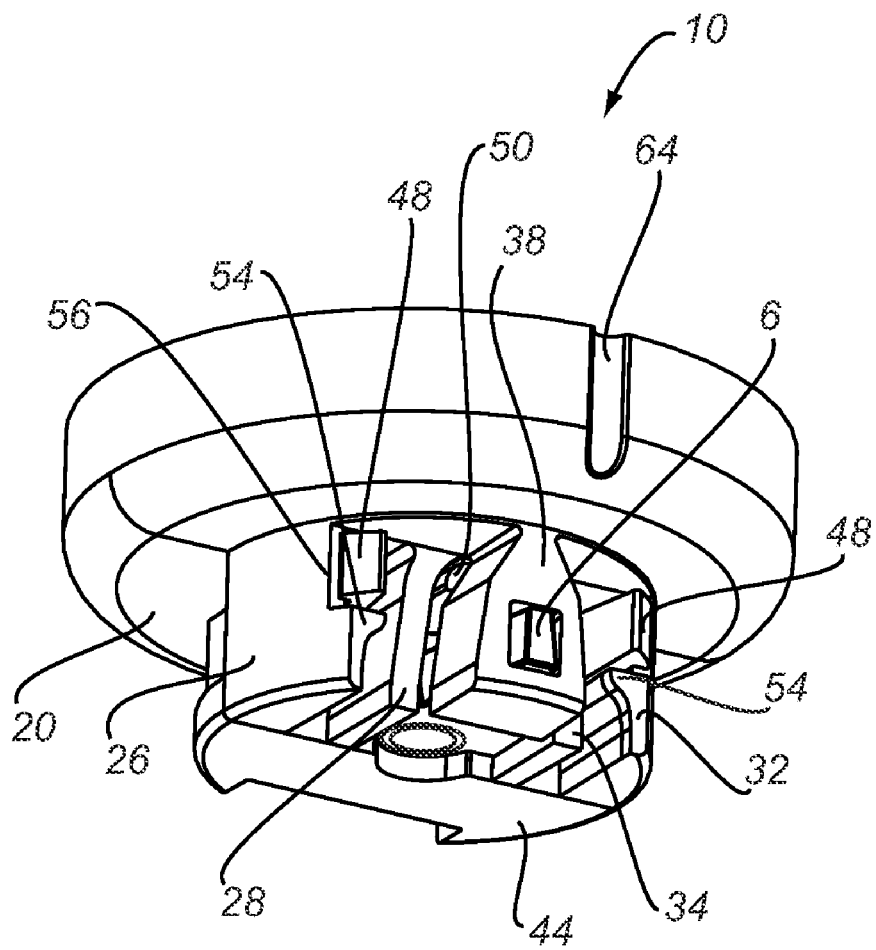
FIG. 24 is a back bottom perspective view of the adapter assembly of FIG. 18 fitted with a pointer of the index of FIG. 18.
Figure 25:
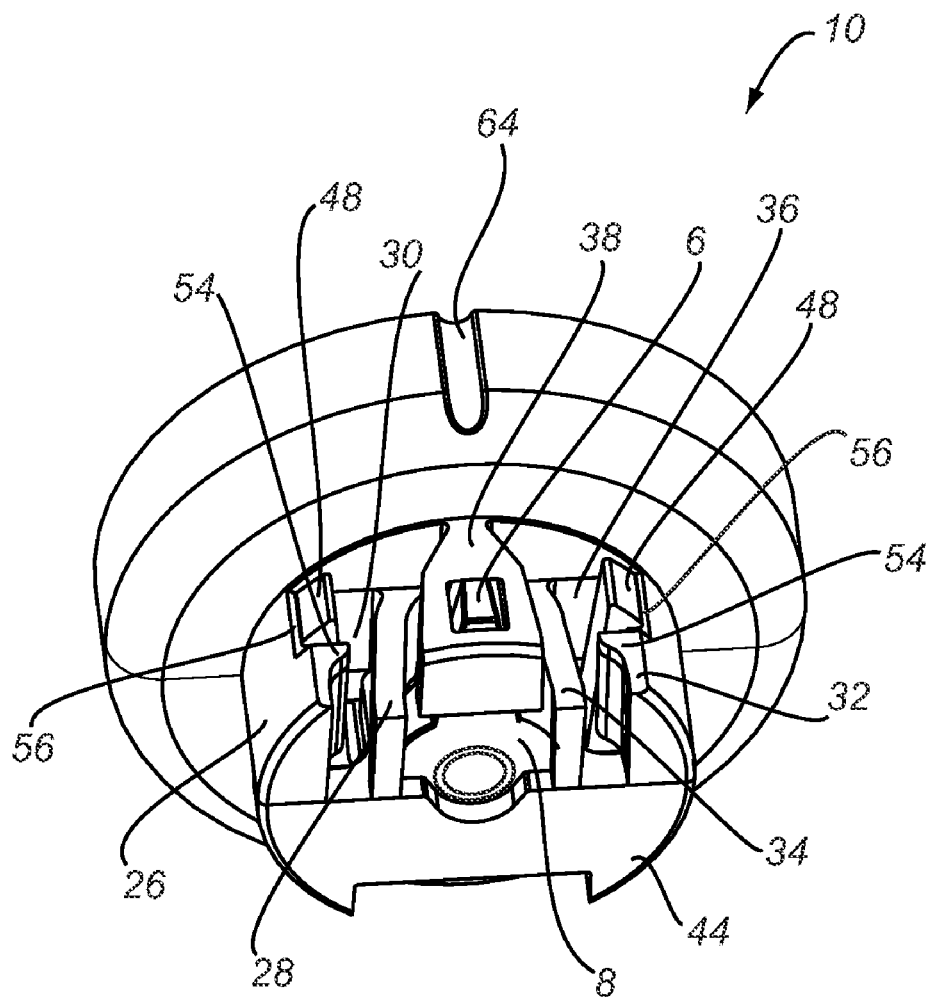
FIG. 25 is another back bottom perspective view of the adapter assembly of FIG. 18 fitted with a pointer of the index of FIG. 18.

As shown in FIG. 6, back surface 20 of upper portion 12 includes a left projection 26 and a left protrusion 28, which are spaced apart from one another to form first gap 30. Back surface 20 of upper portion 12 also includes a right projection 32 and a right protrusion 34, which are spaced apart from one another to form second gap 36. Left protrusion 28 and right protrusion 34 are spaced apart from one another to form a third gap 58 (FIG. 5). Left projection 26 and right projection 32 each include an edge 54 (shown in FIGS. 6 and 8) that extends laterally from each projection to reduce the size of the gaps 30 and 36, as illustrated in FIG. 6. As shown in FIG. 8, left and right projections 26, 32 each include a planar side 56. As shown in FIG. 5, projections 26, 32 have a slightly greater depth than protrusions 28, 34. As also shown in FIG. 6 and FIGS. 24-25, back surface 20 also includes a middle protrusion 38 having an opening 40 that is shaped and sized to receive a tip 6 of a pointer 4 of the gas meter index 2 illustrated in FIGS. 23-25. Middle protrusion 38 also includes a tongue 41, which is adjacent opening 40 and extends laterally from middle protrusion 38.

The upper portion fits together with the clip to form adapter assembly 10 for use with index 2. As shown in FIGS. 21-25, the back surface 20 of upper portion 12 is positioned relative to the back surface 42 of clip 14 as the upper portion 12 and clip 14 fit together. FIGS. 9-17 show various views of clip 14. As shown in FIGS. 9-12, clip 14 includes two arms 46a, 46b, which extend from the back 42 of clip 14 and which each include an extension 48a, 48b that extends laterally from the respective arm 46a, 46b. Turning to FIGS. 23-25, arms 46 of clip 14 are configured to be received within the first gap 30 and the second gap 36, respectively, of the back surface 20 of upper portion 12 when clip 14 mates with upper portion 12. Extension 48 abuts planar side 56 of left and right projections 26, 32 when clip 14 mates with upper portion 12 (see FIGS. 24-25).

Figure 9:
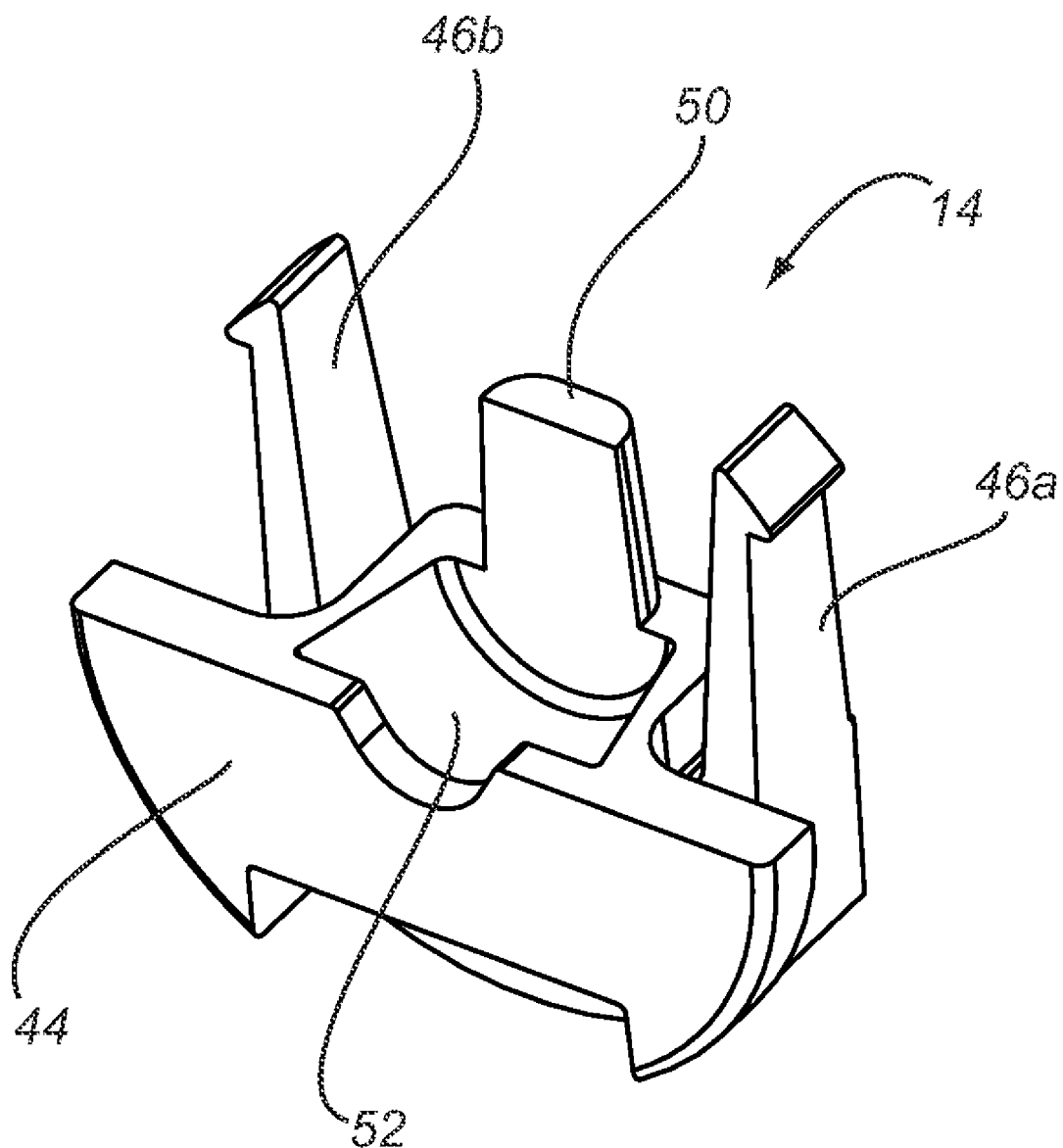
FIG. 9 is a top front perspective view of a clip of an adapter assembly according to one embodiment of the invention.
Figure 10:
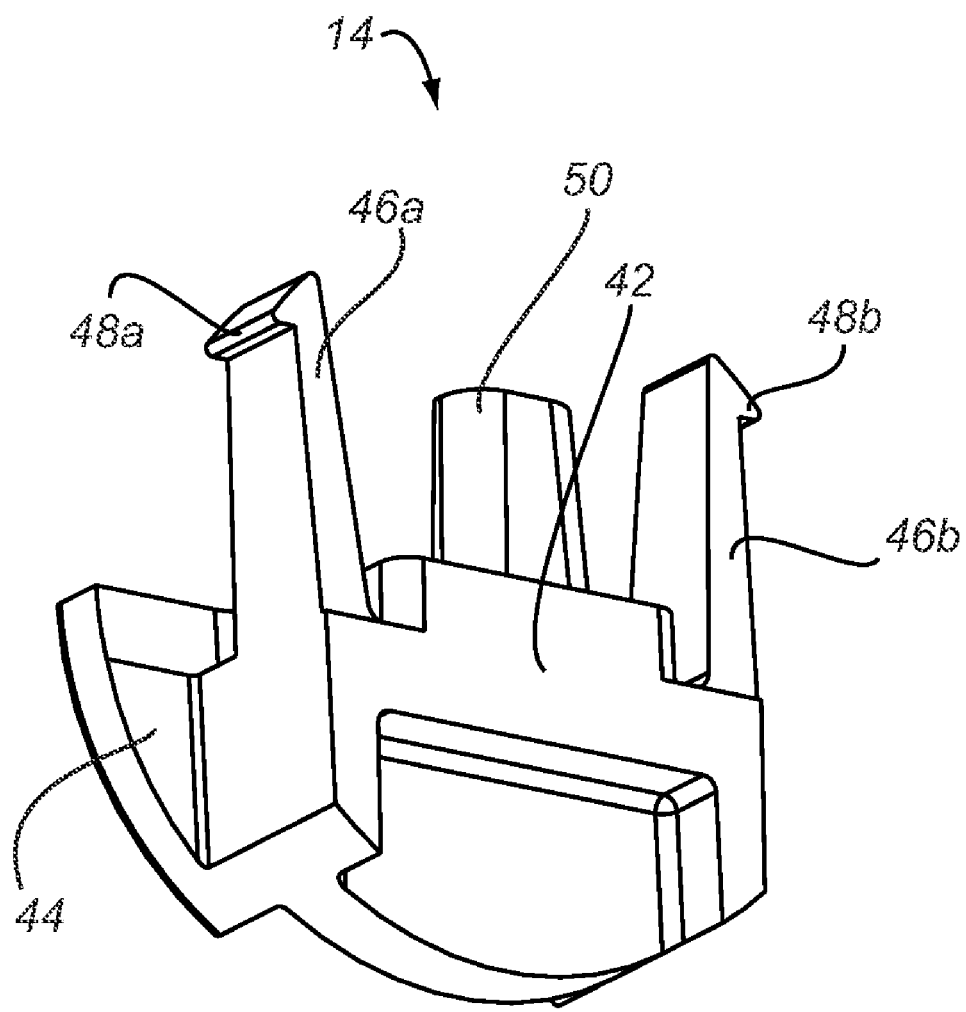
FIG. 10 is a back perspective view of the clip of FIG. 9.
Figure 11:
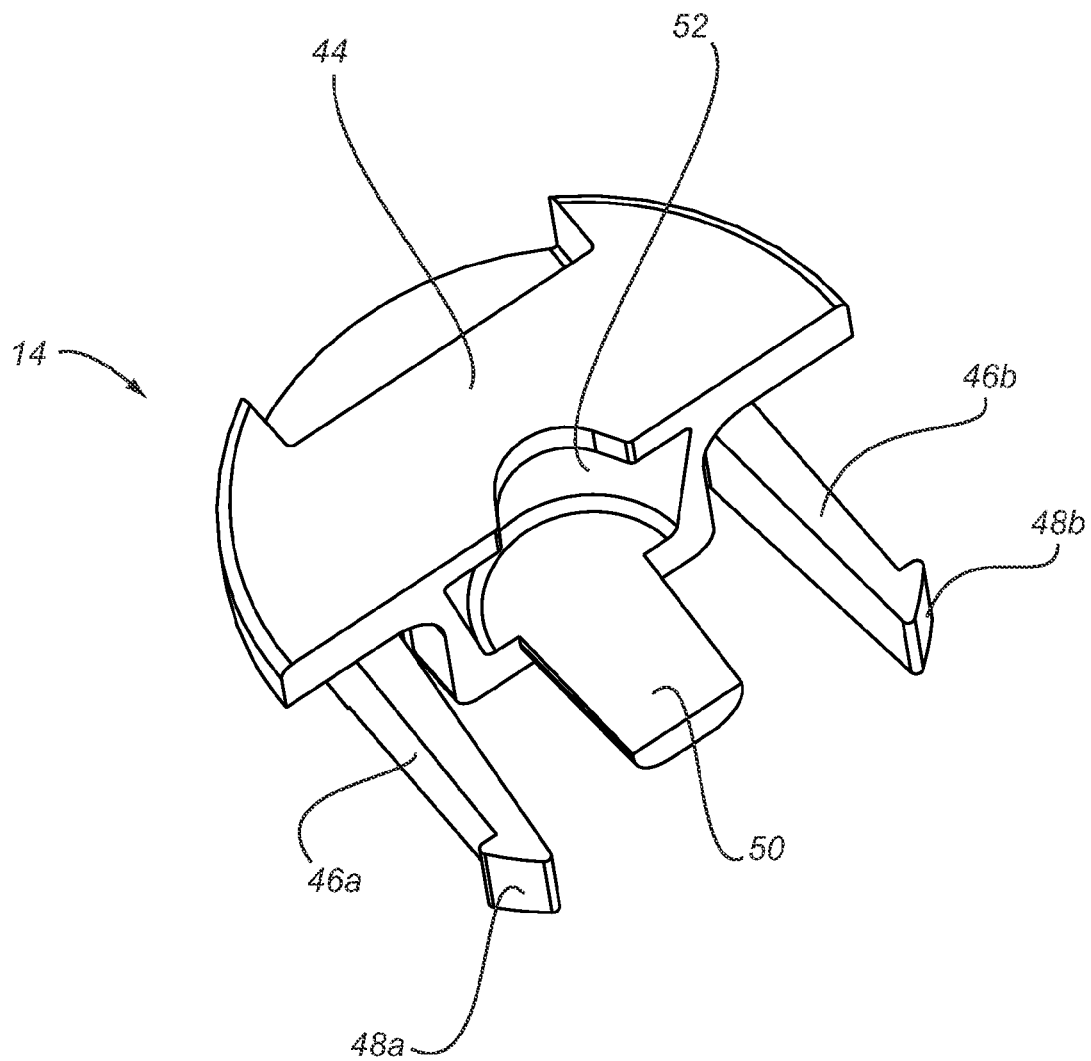
FIG. 11 is a front perspective view of the clip of FIG. 9.
Figure 12:
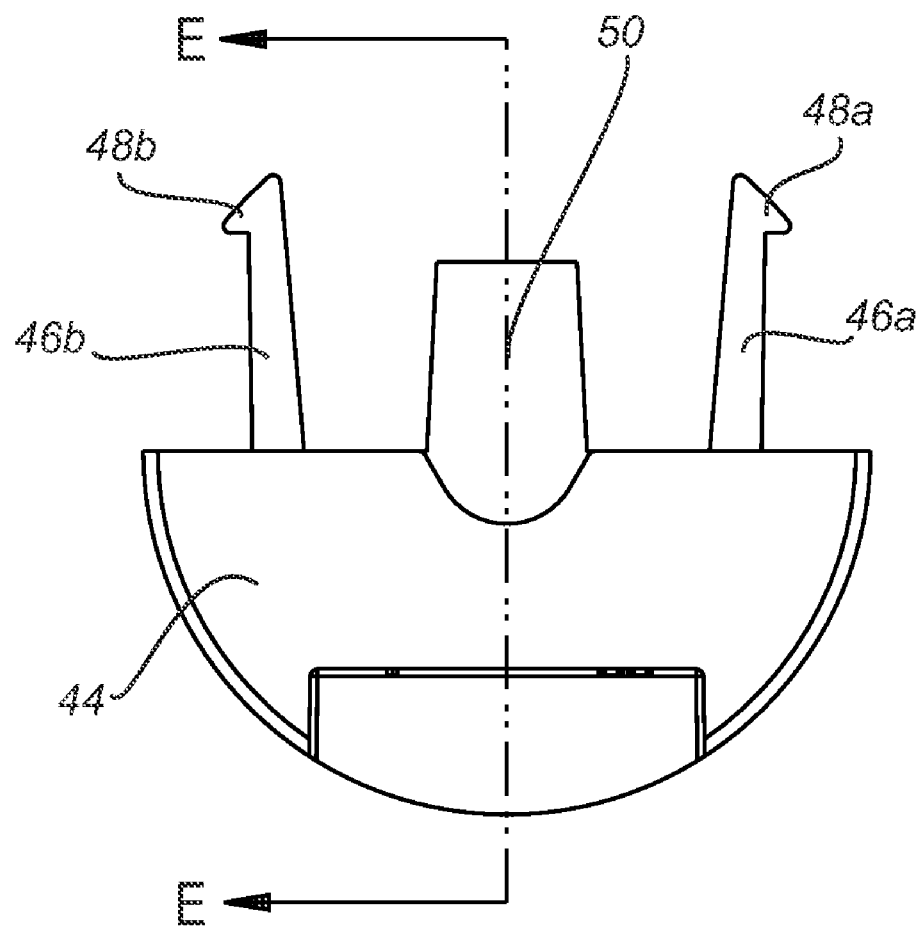
FIG. 12 is a front plan view of the clip of FIG. 9.
Figure 13:
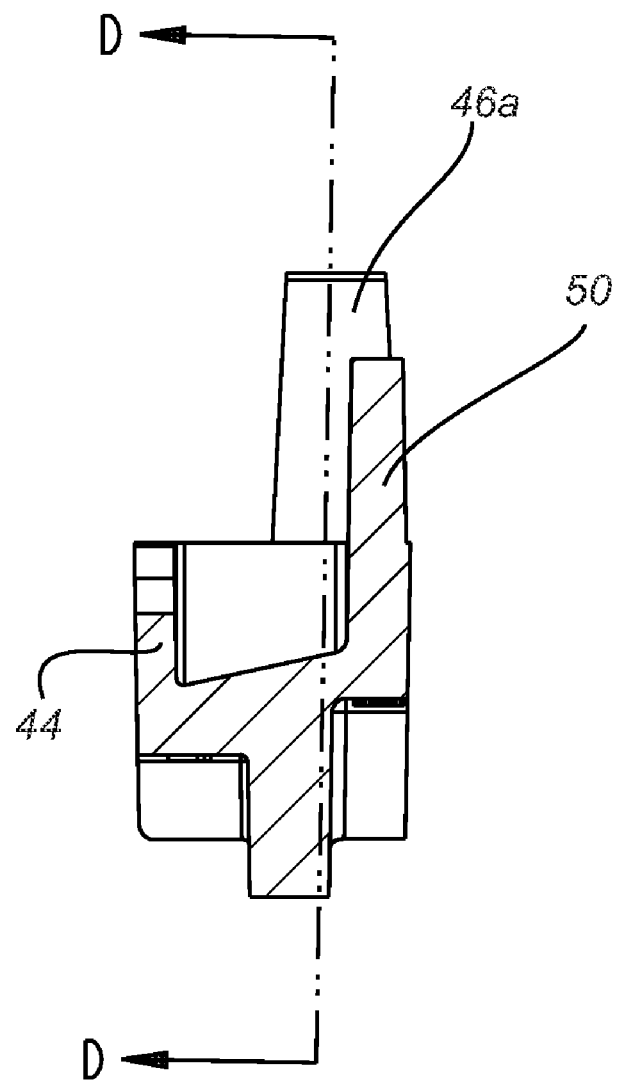
FIG. 13 is a cross-sectional view of the clip of FIG. 9, taken along line E-E of FIG. 12.
Figure 14:
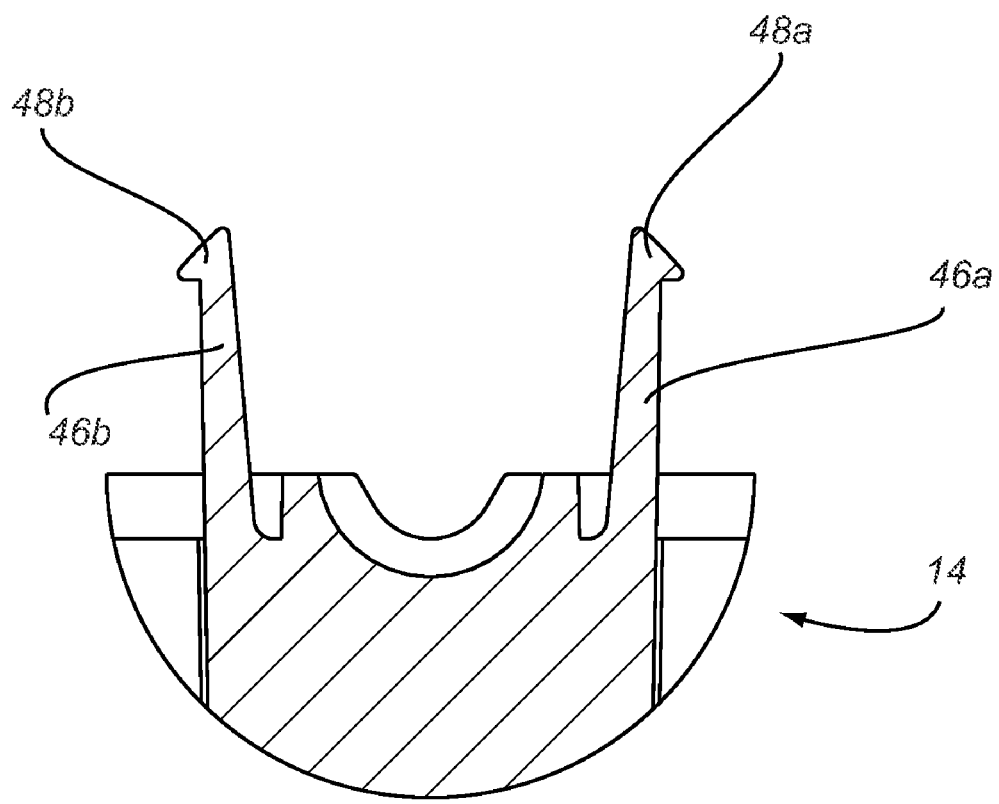
FIG. 14 is a cross-sectional view of the clip of FIG. 9, taken along line D-D of FIG. 13.
Figure 15:
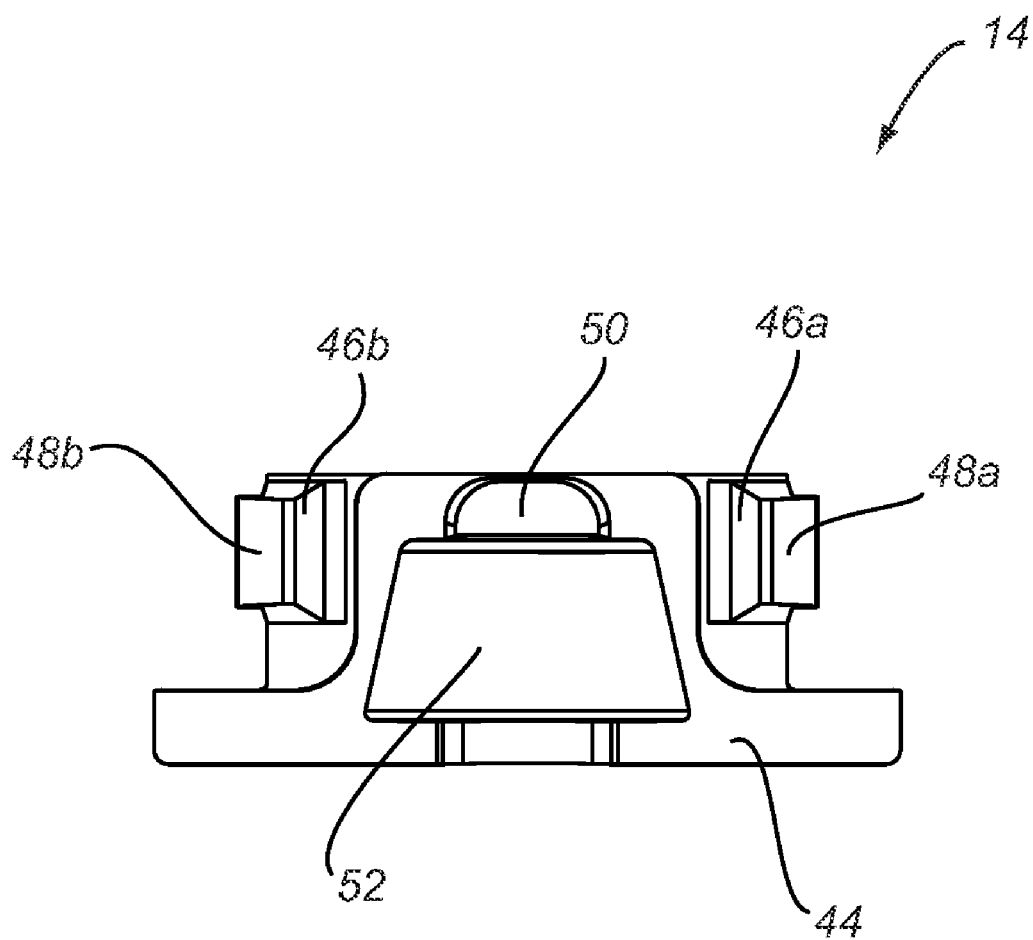
FIG. 15 is a top plan view of the clip of FIG. 9.
Figure 16:
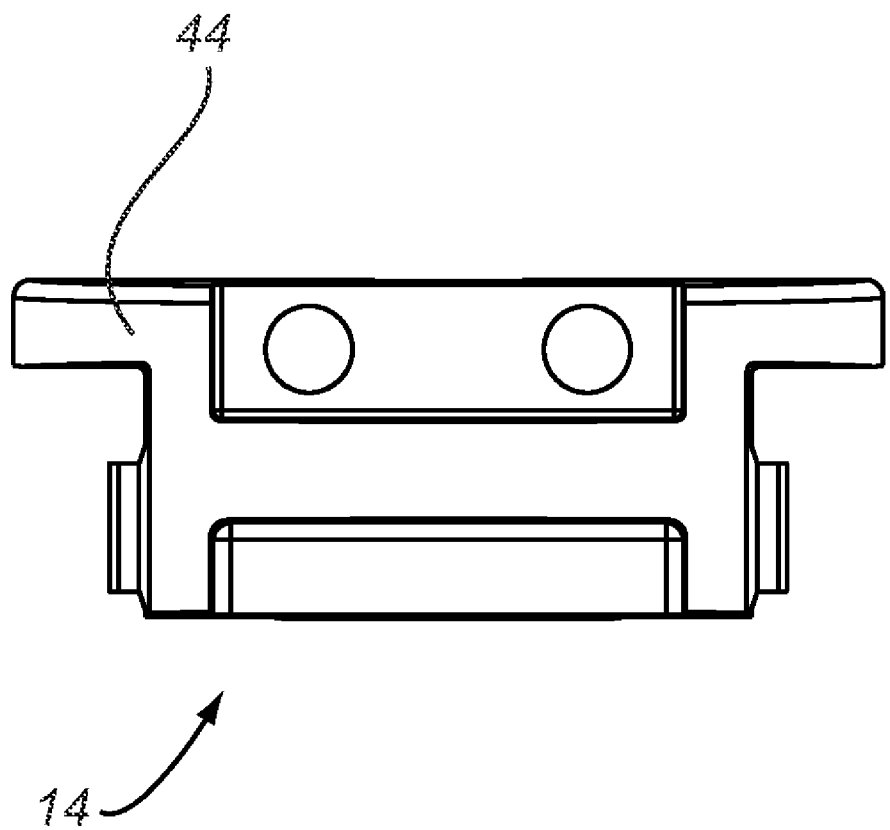
FIG. 16 is a bottom plan view of the clip of FIG. 9.
Figure 17:
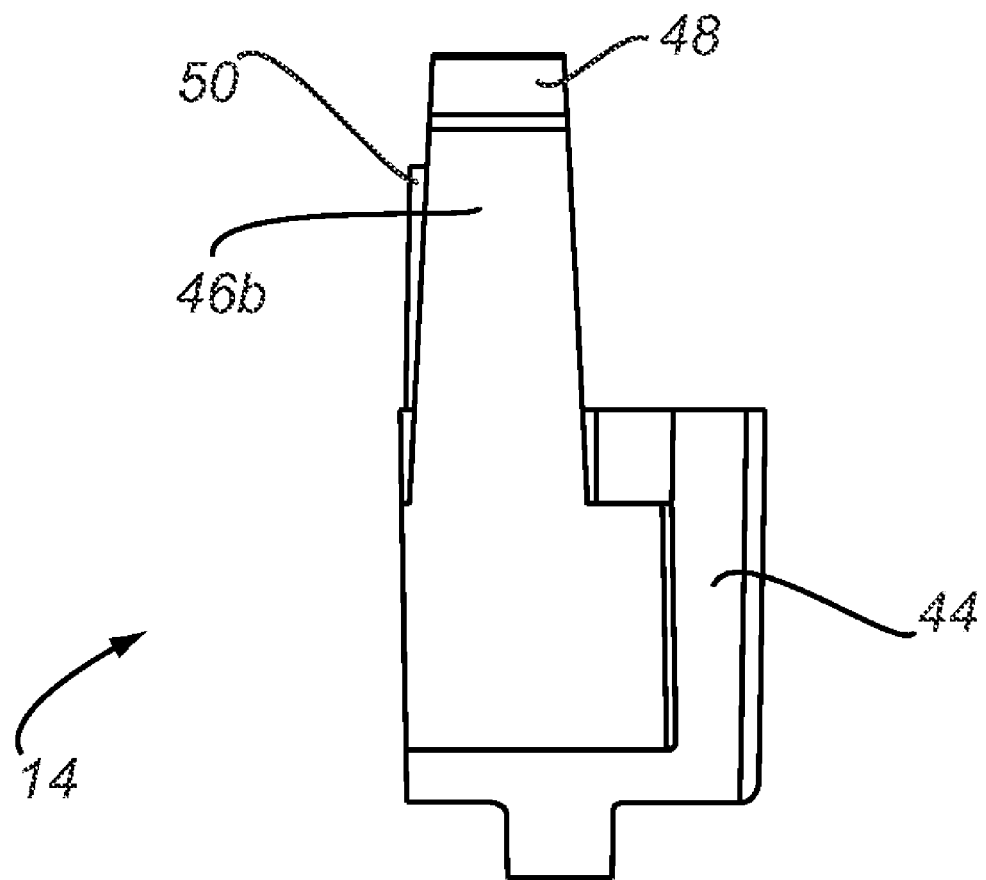
FIG. 17 is a side plan view of the clip of FIG. 9.

Clip 14 also includes a cavity 52 between a front surface 44 of the clip and the back of clip 14 (FIG. 9). Cavity 52 is shaped and sized to accommodate the body 8 of pointer 4 of index 2 (FIG. 23), as explained below. The back 42 of clip 14 also includes a tongue 50 that fits between left protrusion 28 and right protrusion 34 of the back surface 20 of upper portion 12 and lies adjacent to back surface 20 of upper portion 12 and above tongue 41 when upper portion 12 and clip 14 are fitted together.

Figure 18:
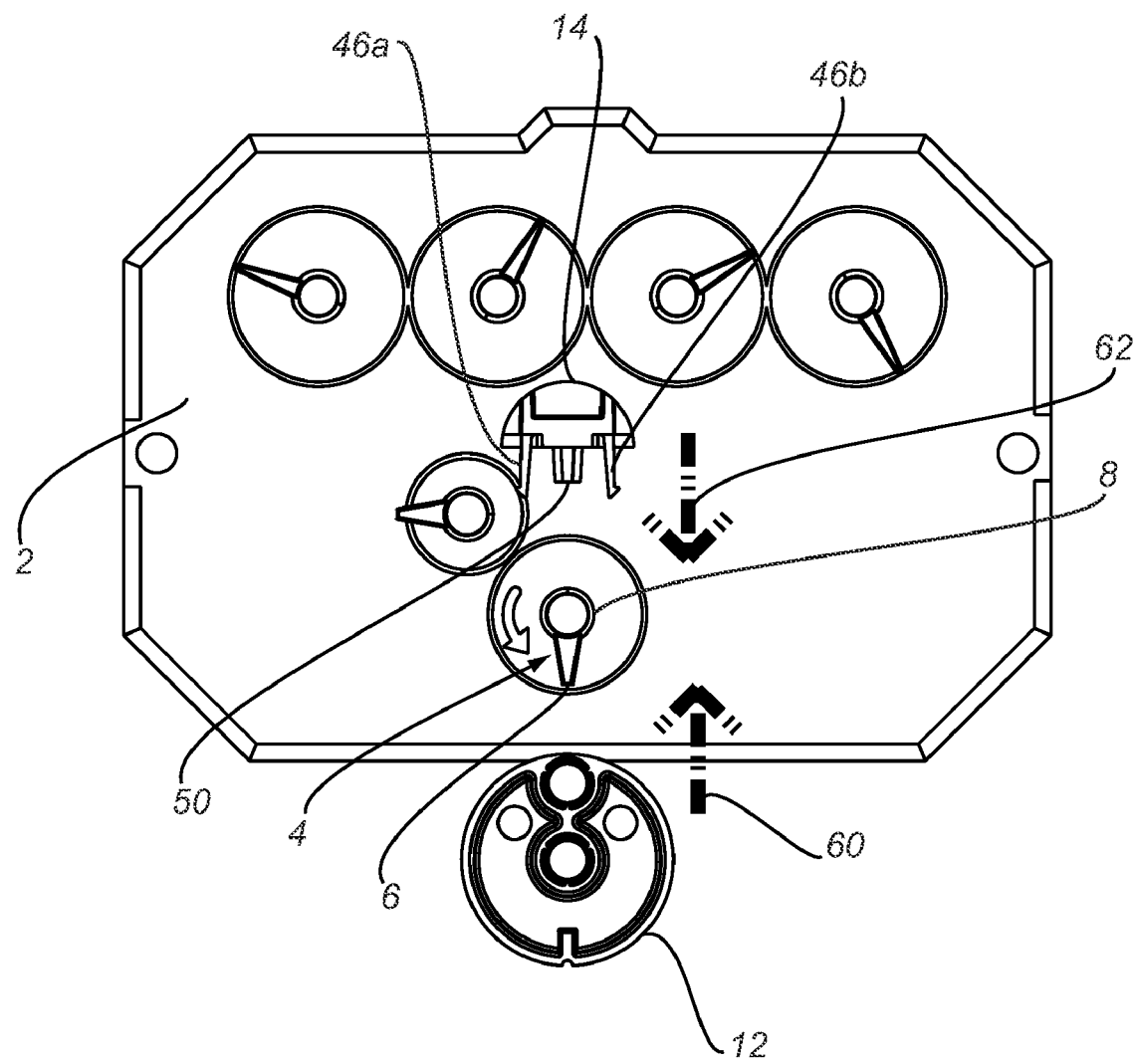
FIG. 18 is a front plan view of an index positioned with respect to the upper portion of FIG. 1 and the clip of FIG. 9, according to one embodiment of the invention.

In use, as shown in FIGS. 18 and 23, upper portion 12 and clip 14 mate together to engage pointer 4 of index 2. Specifically, upper portion 12 is positioned with respect to index 2 from a first direction 60 so that the pointer 4 slides through the third gap 58 formed between left protrusion 28 and right protrusion 34 of upper portion 12 (FIG. 5) and so that tip 6 of pointer 4 slides into opening 40 of middle protrusion 38 of upper portion 12. Protrusions 28 and 34 cradle pointer 4 and exert force on the sides of the pointer 4 to maintain the alignment of pointer 4 within the adapter assembly and prevent upper portion 12 and clip 14 from wobbling. Exerting force on the sides of the pointer 4 also helps push the upper portion 12 and clip 14 assembly away from index 2 so that neither upper portion 12 or clip 14 rubs against index 2, which could shorten the life span of index 2. In some embodiments, the third gap 58 between left protrusion 28 and right protrusion 34 is smaller than a diameter of the pointer to ensure a tight fit between upper portion 12 and pointer 4. In some embodiments, as shown in FIG. 6, left and right protrusions 28, 34 extend from back surface 20 of upper portion 12 at a radius and at an angle other than a right angle, which causes them to abut the sides of edges 54 of projections 26, 32. In this way, the edges 54 of projections 26, 32 act as a stopping mechanism for flexing protrusions 28, 34 and creating a spring load that exerts force on the sides of pointer 4. Left and right protrusions 28, 34 can extend from back surface 20 at any suitable angle to maintain the desired spring load force exerted on pointer 4, so long as the angle is not great enough to cause protrusions 28, 34 to lose elasticity.

Next, clip 14 is positioned with respect to index 2 from a second direction 62, which is opposite first direction 60, so that clip 14 cooperates with pointer 4 and is mated onto upper portion 12 (FIG. 18). Clip 14 can be snap fit onto upper portion 12 to lock the upper portion 12 with respect to the pointer 4. Specifically, body 8 of pointer 4 abuts the cavity 52 of clip 14 when the tip 6 of pointer 4 is received within opening 40 of middle protrusion 38 of upper portion 12. Tongue 50 of clip 14 is received between left and right protrusions 28, 34 and above tongue 41 of middle protrusion 38. Tongue 50 acts as a guiding pin and helps reduce any rocking of upper portion 12 and clip 14 when fitted together around pointer 4.

The rotation of the internal gears of the gas meter cause the pointer 4 to rotate, which can be used to track consumption as described above. Because the adapter assembly 10 is securely coupled to the pointer 4, the rotation of the pointer 4 causes the adapter assembly 10, and thus the magnets 16, to also rotate in a concentric motion. In some embodiments, one of the magnets 16 aligns with the axis of rotation of the pointer 4. The rotation of the magnet furthest from the center of upper portion 12 generates magnetic pulses that can be used to determine that the adapter assembly 10 is present on the index 2 and/or can be used to track the number of rotations of the pointer of the gas meter, and thus the consumption of gas as known to those of skill in the art. The magnet closer to the center of upper portion 12 can be used as a tamper detection feature so that it generates a signal if someone attempts to tamper with the adapter assembly 10. For example, if upper portion 12 and clip 14 are removed from pointer 4, the magnet closer to the center of upper portion 12 moves from its initial position and thus generates a signal corresponding to such movement. In some embodiments, a sensor board and radio assembly (not shown) are mounted adjacent the adapter assembly 10 and receives the pulses generated by the magnets, converts them into electronic form, and transmits them to a remote location. In some embodiments, the sensor board is located approximately 0.1-0.3 inches or any other suitable distance from the adapter assembly.

Figure 19:
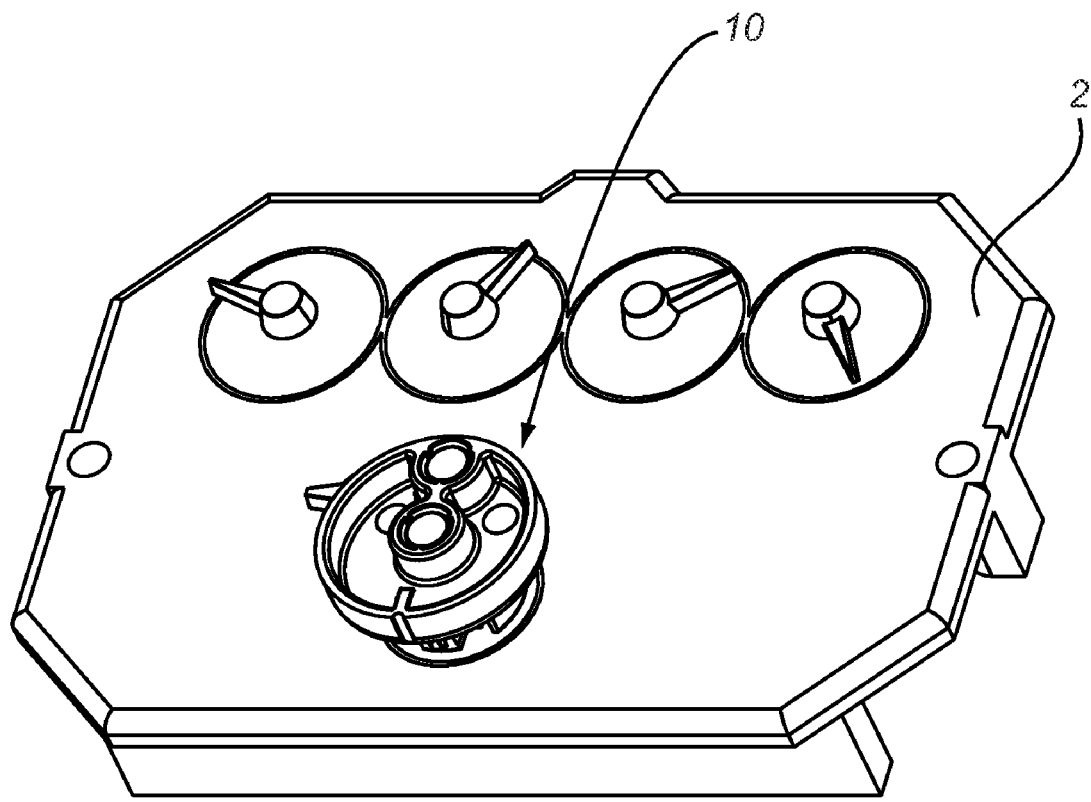
FIG. 19 is a front bottom perspective view of the index of FIG. 18 fitted with the adapter assembly of FIG. 18.
Figure 20:
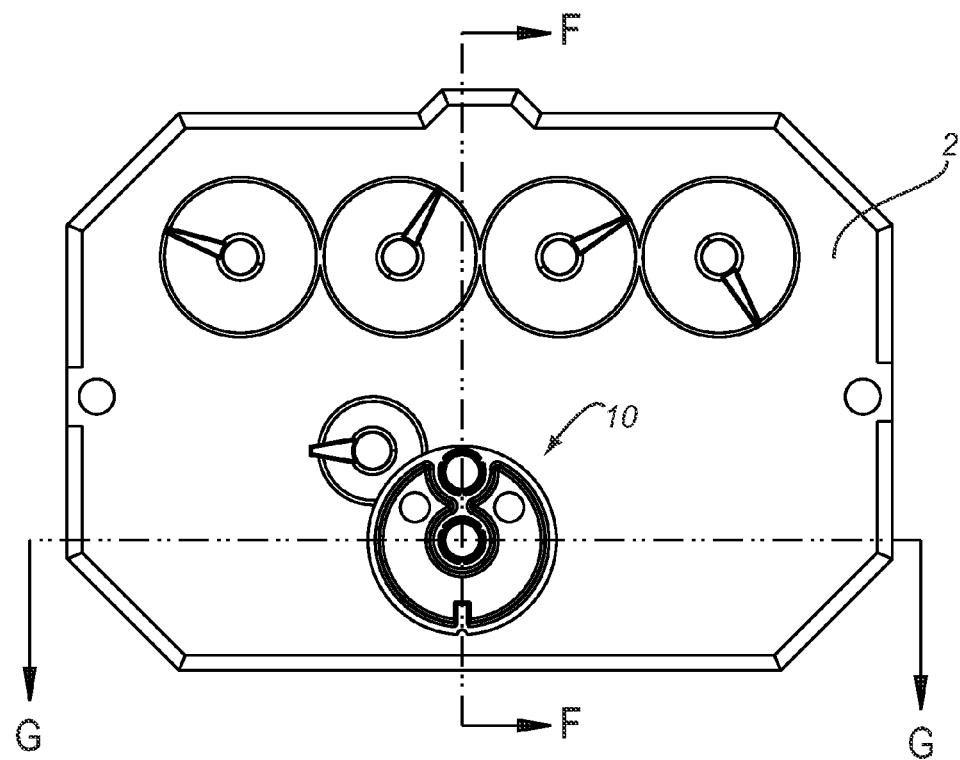
FIG. 20 is a front plan view of the index of FIG. 18 fitted with the adapter assembly of FIG. 18.
Figure 21:
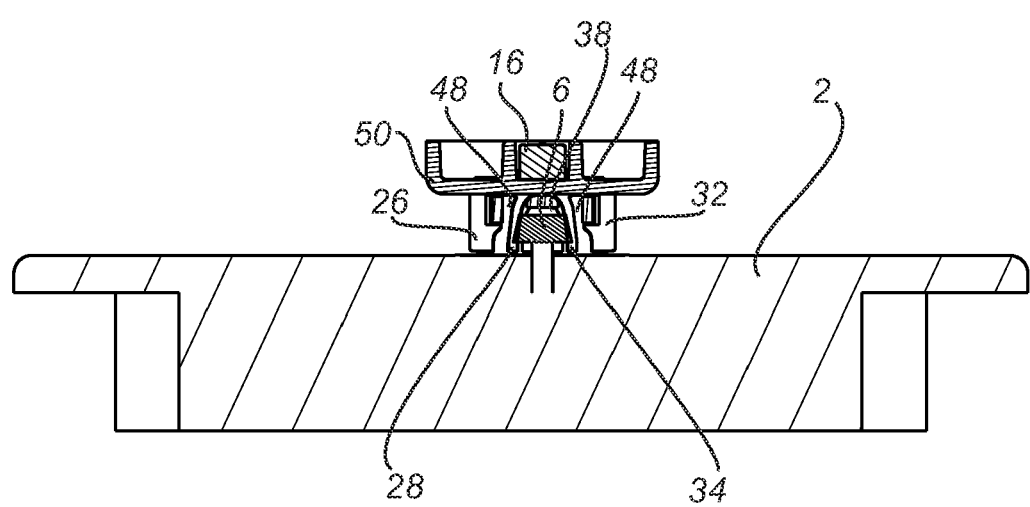
FIG. 21 is a cross-sectional view of the index of FIG. 18 fitted with the adapter assembly of FIG. 18, taken along line G-G of FIG. 20.
Figure 22:
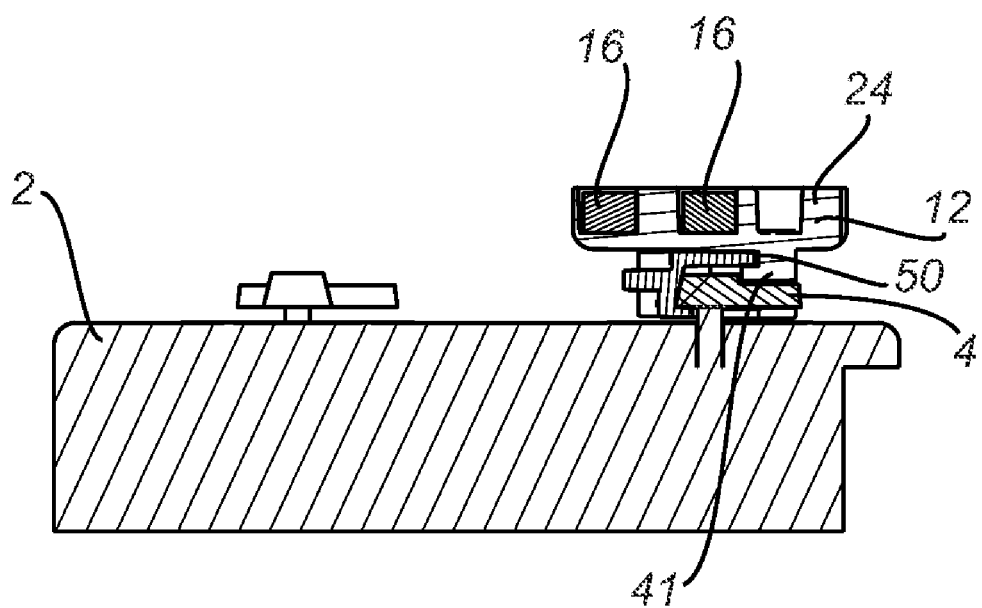
FIG. 22 is a cross-sectional view of the index of FIG. 18 fitted with the adapter assembly of FIG. 18, taken along line F-F of FIG. 20.

In some embodiments, upper portion 12 includes an indicator tab 24 positioned on front surface 18, which is radially aligned with opening 40 of middle protrusion 38 so that indicator tab 24 serves as an indicator for the orientation of pointer 4. Thus, even though pointer 4 is hidden from view by adapter assembly 10, indicator tab 24 allows the positioning/orientation of pointer 4 on index 2 to be determined. In addition to or as an alternative to indicator tab, upper portion 12 could include a notch, marking, or other suitable indicator. Similarly, upper portion 12 can optionally include a notch 64 (FIG. 24) that aligns with the tip 6 of pointer 4 and that can be used to determine where pointer 4 is located on index 2. As shown in FIGS. 18-20, adapter assembly 10 is small enough that the majority of index 2 is still visible when adapter assembly 10 engages pointer 4.

The configuration of upper portion 12 and clip 14 allows the two components to fit together around pointer 4 in a manner that allows the adapter assembly 10 to track to the pointer 4 without impacting the rotation of the pointer. Because adapter assembly 10 includes clip 14, clip 14 having a front surface 44 that is spaced apart from the back of the clip, the back surface 20 of the upper portion 12 of adapter assembly does not contact the index in use. This reduces stress or friction on the index, which could shorten the life span of the index, as adapter assembly 10 rotates with pointer 4. Moreover, this configuration allows pointer 4 to rotate without obstruction.

In some embodiments, upper portion 12 and/or clip 14 are formed of polycarbonate, which is lightweight compared to the magnets 16, which are made of neodymium and iron in some embodiments. The lightweight nature of the adapter assembly 10 allows it to rotate freely with the pointer 4 and without exerting undue pressure on the pointer 4 (and in turn on the index). In other embodiments, adapter assembly 10 is made of other suitable materials.

Numerous modifications of this invention may be made in the composition, application, manufacturing process and other aspects of this invention without departing from the objectives and spirit of the description above and in the Figures.

The invention claimed is:

1. An adapter assembly for use with a utility meter having a pointer rotationally coupled to an index, the adapter assembly comprising:
   (a) an upper portion comprising:
      (i) a front surface comprising at least one cavity for receiving a magnet;
      (ii) a back surface;
      (iii) two protrusions that extend from the back surface, wherein the two protrusions are spaced apart from one another to form a first gap, the first gap configured to receive the pointer; and
      (iv) two projections that extend from the back surface, wherein a first of the projections is adjacent a first of the protrusions and spaced apart from the first of the protrusions to form a second gap, and wherein a second of the projections is adjacent a second of the protrusions and spaced part from the second of the protrusions to form a third gap; and
   (b) a clip comprising:
      (i) a front surface;
      (ii) a back portion;
      (iii) two arms that project from the back portion and that are shaped to be received within the second gap and the third gap of the upper portion; and
      (iv) a cavity formed between the front surface of the clip and the back portion that is configured to receive a base of the pointer.

2. The adapter assembly of claim 1, further comprising at least one magnet that is received within the at least one cavity of the upper portion for sending magnetic pulses as the pointer rotates.

3. The adapter assembly of claim 1, wherein the at least one cavity of the upper portion comprises a first cavity located approximate to a center of the front surface of the upper portion and a second cavity located adjacent the first cavity approximate an edge of the front surface of the upper portion.

4. The adapter assembly of claim 1, wherein the upper portion further comprises an indicator that is aligned with a longitudinal axis of the first gap for indicating the position of the pointer.

5. The adapter assembly of claim 1, wherein the upper portion further comprises a middle protrusion that extends from the back surface and that comprises an opening configured to receive a tip of the pointer.

6. The adapter assembly of claim 1, wherein the two protrusions extend from the back surface of the upper portion in such a way that an angle formed between the back surface and the two protrusions when viewed from the bottom of the upper portion is not equal to 90°.

7. The adapter assembly of claim 1, further comprising a tongue that extends from the back portion of the clip and that is accommodated within the first gap of the upper portion.

8. The adapter assembly of claim 1, wherein the upper portion does not contact the index when the adapter assembly is rotationally coupled to the index due in part to the cavity formed between the front surface of the clip and the back portion.

9. The adapter assembly of claim 1, wherein the upper portion is circular.

10. The adapter assembly of claim 1, wherein the two arms of the clip each comprise an extension that abuts a side of the two protrusions of the upper portion.

11. A method for adapting a utility meter having an index with a rotatable pointer comprising:
   providing a first component comprising a back surface, a front surface comprising at least one cavity, a gap formed between two protrusions that extend from the back surface, and an opening formed in a middle protrusion that extends from the back surface;
   providing a second component comprising a front surface, a back portion, a cavity formed between the front surface and the back portion, and two arms that project from the back portion;
   aligning the first component with the pointer;
   inserting the pointer through the gap and into the opening of the first component;
   aligning the second component with the pointer and with the first component so that a body of the pointer is positioned with respect to the cavity of the second component and so that the two arms of the second component abut the back surface of the first component; and
   securing the second component to the first component.

12. The method of claim 11, further comprising inserting a magnet into the cavity of the front surface of the first component.

13. The method of claim 11, wherein the second component is aligned with the first component so that the back surface of the first component does not contact the index.

14. The method of claim 11, wherein the step of providing a first component with at least one cavity comprises providing a first component with a first cavity and a second cavity, and the method further comprising the step of inserting a second magnet into the second cavity for determining if the first component has been tampered with.

15. An adapter assembly for use with a utility meter having a pointer rotationally coupled to an index, the adapter assembly comprising:
   a clip that is configured to interface with at least a portion of the pointer;
   an upper portion that mates with the clip and that is configured to interface with at least a portion of the pointer so that the upper portion rotates when the pointer rotates, the upper portion further comprising at least one cavity;
   wherein the clip mates with the upper portion in such a way that a back surface of the upper portion does not contact the index when the upper portion interfaces with the pointer; and
   wherein the at least one cavity is aligned with an axis of rotation of the pointer when the upper portion interfaces with the pointer.

16. The adapter assembly of claim 15, wherein the interface between the upper portion and the pointer comprises an opening defined in a protrusion extending from the back surface of the upper portion, wherein a diameter of the opening is slightly smaller than a diameter of the pointer.

17. The adapter assembly of claim 15, wherein the interface between the upper portion and the pointer comprises a gap formed between two protrusions that extend from the back surface of the upper portion, wherein a diameter of the gap is slightly smaller than a diameter of the pointer.

* * * * *